US012570399B2

(12) United States Patent
 Aizawa et al.

(10) Patent No.: US 12,570,399 B2
(45) Date of Patent: Mar. 10, 2026

(54) VERTICAL TAKE-OFF AND LANDING AIRCRAFT

(71) Applicant: HONDA MOTOR CO., LTD., Tokyo (JP)

(72) Inventors: Bon Aizawa, Wako (JP); Toshinori Tsukamoto, Wako (JP); Masashi Kato, Wako (JP); Kenta Uchida, Wako (JP); Kaisaku Yoshimura, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 18/592,939

(22) Filed: Mar. 1, 2024

(65) Prior Publication Data

US 2024/0300643 A1 Sep. 12, 2024

(30) Foreign Application Priority Data

Mar. 7, 2023 (JP) ................................. 2023-034391

(51) Int. Cl.
 *B64C 29/00* (2006.01)

(52) U.S. Cl.
 CPC ................................ *B64C 29/0025* (2013.01)

(58) Field of Classification Search
 CPC .. B64C 29/0016; B64C 29/0025; B64C 27/30
 See application file for complete search history.

(56) References Cited

U.S. PATENT DOCUMENTS

| | | | |
|---|---|---|---|
| 10,131,426 B2 | 11/2018 | Judas et al. | |
| 10,526,079 B1 * | 1/2020 | Reichert | ................. B64C 27/08 |
| 2019/0127056 A1 * | 5/2019 | Weekes | ................... B64C 39/12 |

* cited by examiner

*Primary Examiner* — Nicholas McFall
(74) *Attorney, Agent, or Firm* — Rankin, Hill & Clark LLP

(57) ABSTRACT

A plurality of VTOL rotors are divided into a plurality of groups, and each VTOL rotor is included in any one of the groups. A controller can perform stop control for stopping the rotation operation of each VTOL rotor during flight, and in a case of canceling the stop control of the plurality of VTOL rotors, the controller performs cancellation of the stop control sequentially on a group-by-group basis.

8 Claims, 12 Drawing Sheets

ROTATIONAL
SPEED

TARGET
ROTATIONAL
SPEED 24a, 24d 24b, 24c

TIME

VERTICAL TAKE-OFF AND LANDING AIRCRAFT

CROSS-REFERENCE TO RELATED APPLICATIONS

This application is based upon and claims the benefit of priority from Japanese Patent Application No. 2023-034391 filed on Mar. 7, 2023, the contents of which are incorporated herein by reference.

BACKGROUND OF THE INVENTION

Field of the Invention

The present invention relates to a vertical take-off and landing aircraft including a plurality of VTOL rotors and one or more cruise rotors.

Description of the Related Art

Recently, vertical take-off and landing aircraft (VTOL aircraft) have been developed. Some types of VTOL aircraft include a plurality of VTOL rotors and one or more cruise rotors. The VTOL rotors generate thrust in the vertical direction. The VTOL rotors are mainly used during takeoff and landing of the VTOL aircraft. The cruise rotors generate thrust in the horizontal direction. The cruise rotors are mainly used during cruise of the VTOL aircraft.

Blades of each VTOL rotor experience air resistance while the VTOL aircraft is cruising. That is, the VTOL rotors generate drag while the VTOL aircraft is cruising. While the VTOL aircraft is cruising, it is preferable to reduce drag caused by the VTOL rotors. U.S. Pat. No. 10,131,426 B2 discloses a technique for reducing drag by stopping rotation of each VTOL rotor while the VTOL aircraft is cruising.

SUMMARY OF THE INVENTION

When the rotation of each VTOL rotor is stopped while the VTOL aircraft is cruising, the rotation of each VTOL rotor that has been stopped needs to be restarted before the landing of the VTOL aircraft. When the rotation of the VTOL rotor that has been stopped is restarted, new thrust in the vertical direction acts on the VTOL aircraft. If the thrust change in the vertical direction is large, the ride comfort of the VTOL aircraft deteriorates.

An object of the present invention is to solve the above-mentioned problem.

According to an aspect of the present invention, there is provided a vertical take-off and landing aircraft comprising: a plurality of vertical take-off and landing rotors configured to generate thrust in a vertical direction; at least one cruise rotor configured to generate thrust in a horizontal direction; at least one wing configured to generate lift as the vertical take-off and landing aircraft moves in the horizontal direction; and a controller configured to control an operation of each of the plurality of vertical take-off and landing rotors and an operation of each of the at least one cruise rotor, wherein the plurality of vertical take-off and landing rotors are divided into a plurality of groups, each of the vertical take-off and landing rotors being included in any one of the groups, and the controller is configured to: perform stop control for stopping a rotation operation of each of the vertical take-off and landing rotors during flight of the vertical take-off and landing aircraft; and in a case of canceling the stop control of the plurality of vertical take-off and landing rotors, perform cancellation of the stop control sequentially on a group-by-group basis.

According to the present invention, it is possible to suppress a change in the ride comfort of the VTOL aircraft at the stage of transition from cruise to landing.

The above and other objects, features, and advantages of the present invention will become more apparent from the following description when taken in conjunction with the accompanying drawings, in which a preferred embodiment of the present invention is shown by way of illustrative example.

BRIEF DESCRIPTION OF THE DRAWINGS

FIG. 5 is a graph illustrating a temporal change in the rotational speed of VTOL rotors in each row in the first grouping;

FIG. 7 is a graph illustrating a temporal change in the rotational speed of the VTOL rotors in each row in the first grouping;

FIG. 8 is a graph illustrating a temporal change in the rotational speed of the VTOL rotors in each row in the second grouping;

FIG. 9 is a graph illustrating a temporal change in the rotational speed of the VTOL rotors in each row in the second grouping;

DETAILED DESCRIPTION OF THE INVENTION

[1. Configuration of Vertical Take-Off and Landing Aircraft 10]

Figure 1:
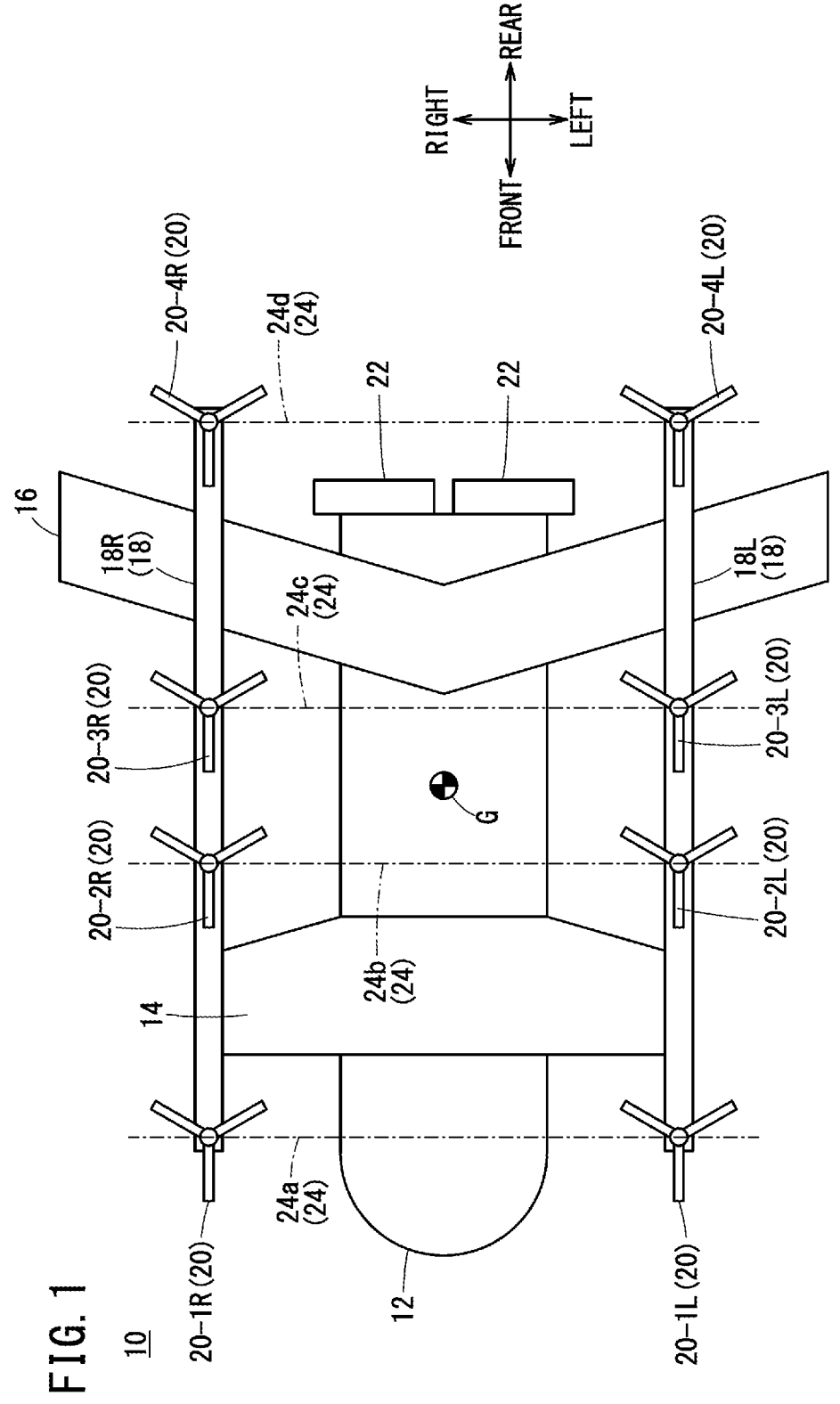
FIG. 1 is a top view of a vertical take-off and landing aircraft.

FIG. 1 is a top view of a vertical take-off and landing aircraft 10. Hereinafter, the vertical take-off and landing aircraft 10 is also referred to as a VTOL aircraft 10. The VTOL aircraft 10 is, for example, an electric vertical take-off and landing aircraft (eVTOL aircraft). The VTOL aircraft 10 includes a fuselage 12, a front wing 14, a rear wing 16, two booms 18, eight VTOL rotors 20, and two cruise rotors 22.

The VTOL aircraft 10 shown in FIG. 1 is an example of an aircraft that employs the present invention. The present invention is applicable to aircraft in which each VTOL rotor 20 is stopped in a state in which lift is generated by a fixed wing.

The front wing 14 is connected to a front portion of the fuselage 12. The rear wing 16 is connected to a rear portion of the fuselage 12. The front wing 14 and the rear wing 16 generate lift as the VTOL aircraft 10 moves forward.

A boom 18R of the two booms 18 is disposed on the right side of the fuselage 12. A boom 18L of the two booms 18 is disposed on the left side of the fuselage 12. Each boom 18 extends in the front-rear direction.

Four motors 40 (FIG. 2) are arranged on the boom 18L sequentially toward the rear. Similarly, four motors 40 are arranged on the boom 18R sequentially toward the rear. The rotation shaft of each motor 40 is connected to the VTOL rotor 20 corresponding to the motor 40. One or more gears may be interposed between the rotation shaft of the motor 40 and the VTOL rotor 20. The axis of each VTOL rotor 20 is parallel to the vertical direction. Alternatively, the axis of each VTOL rotor 20 may be inclined at a predetermined angle with respect to the vertical direction. Each VTOL rotor 20 is used during vertical takeoff, during transition from takeoff to cruise, during transition from cruise to landing, during vertical landing, and during hovering. When the VTOL rotor 20 rotates, thrust in the vertical direction is generated.

As shown in FIG. 1, the eight VTOL rotors 20 form four rows 24 extending in the left-right direction, specifically, a first row 24a to a fourth row 24d. The first row 24a, the second row 24b, the third row 24c, and the fourth row 24d are arranged in this order from the front to the rear. Each row 24 is formed by two VTOL rotors 20 whose positions in the front-rear direction are substantially the same. The first row 24a is formed by a VTOL rotor 20-1L disposed on the left side of the fuselage 12 and a VTOL rotor 20-1R disposed on the right side of the fuselage 12. The second row 24b is formed by a VTOL rotor 20-2L disposed on the left side of the fuselage 12 and a VTOL rotor 20-2R disposed on the right side of the fuselage 12. The third row 24c is formed by a VTOL rotor 20-3L disposed on the left side of the fuselage 12 and a VTOL rotor 20-3R disposed on the right side of the fuselage 12. The fourth row 24d is formed by a VTOL rotor 20-4L disposed on the left side of the fuselage 12 and a VTOL rotor 20-4R disposed on the right side of the fuselage 12.

Two motors 40 (FIG. 2) are disposed in the fuselage 12 so as to be arranged side by side in the left-right direction. The rotation shaft of each motor 40 is connected to the cruise rotor 22 corresponding to the motor 40. A plurality of gears may be interposed between the rotation shaft of the motor 40 and the cruise rotor 22. The axis of each cruise rotor 22 is substantially parallel to the horizontal direction. Each cruise rotor 22 is used during cruise, during transition from takeoff to cruise, and during transition from cruise to landing. When the cruise rotor 22 rotates, thrust in the horizontal direction is generated.

[2. Configuration of Power Supply System 30]

Figure 2:
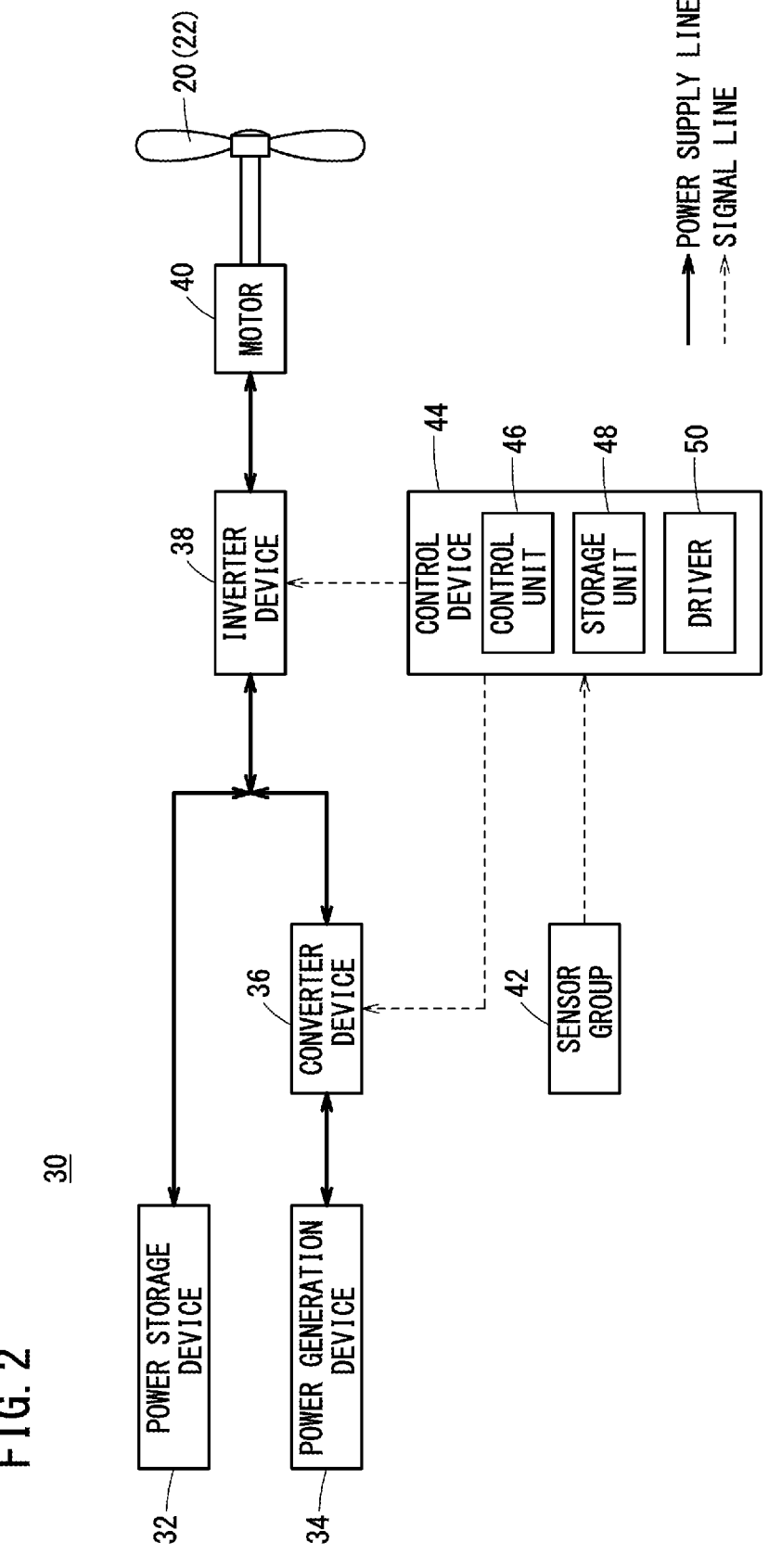
FIG. 2 is a block diagram of a power supply system of the vertical take-off and landing aircraft.

The VTOL aircraft 10 includes a power supply system 30 shown in FIG. 2. FIG. 2 is a block diagram of the power supply system 30 of the vertical take-off and landing aircraft 10. The power supply system 30 includes a power storage device 32, a power generation device 34, a converter device 36, an inverter device 38, the motor 40, a sensor group 42, and a control device 44. In FIG. 2, solid arrows indicate power supply lines, and broken lines indicate signal lines. Although the power supply system 30 including the power generation device 34 is described in the present specification, the power supply system 30 may not include the power generation device 34.

One inverter device 38 and one motor 40 are provided for each rotor (the VTOL rotor 20 or the cruise rotor 22). On the other hand, one power storage device 32, one power generation device 34, and one converter device 36 are provided for the plurality of rotors (the VTOL rotors 20 or the cruise rotors 22). In other words, the power storage device 32, the power generation device 34, and the converter device 36 are shared by a plurality of the power supply systems 30. For example, the same power storage device 32 may be provided for a pair of VTOL rotors 20 (for example, the VTOL rotor 20-1L and the VTOL rotor 20-4R) whose torques cancel each other out.

The power storage device 32 includes, for example, a high-voltage battery. The power generation device 34 includes a generator. The rotation shaft of the generator is connected to, for example, the rotation shaft of a gas turbine engine. The converter device 36 includes a converter circuit. One converter device 36 is provided for one power generation device 34. The primary terminal of the converter circuit is connected to the power generation device 34. The secondary terminal of the converter circuit is connected to the power storage device 32 and the inverter device 38. The converter device 36 can convert AC power output from the power generation device 34 into DC power, and output the DC power to the power storage device 32 and the inverter device 38. In addition, the converter device 36 can transform the voltage of electric power output from the power generation device 34, and output the transformed voltage to the power storage device 32 and the inverter device 38.

The inverter device 38 includes, for example, a three-phase inverter circuit. The inverter circuit includes a plurality of switching elements. The primary terminal of the inverter circuit is connected to the power storage device 32 and the converter device 36. The secondary terminal of the inverter circuit is connected to the motor 40. The inverter device 38 can convert DC power output from at least one of the power storage device 32 or the converter device 36 into AC power, and output the AC power to the motor 40.

The motor 40 is, for example, a three-phase motor. As described above, the rotation shaft of the motor 40 is connected to a hub of one rotor (the VTOL rotor 20 or the cruise rotor 22) directly or via one or more gears.

The sensor group 42 includes sensors included in the VTOL aircraft 10. For example, the sensor group 42 includes one or more angular velocity sensors. The one or more angular velocity sensors detect at least one of pitch, roll, or yaw of the VTOL aircraft 10. Each sensor outputs a signal indicating the detected information to the control device 44.

The control device 44 (a controller) controls the power supply system 30. The control device 44 may be, for example, a flight controller of the VTOL aircraft 10 or a slave controller controlled by the flight controller. The control device 44 includes a control unit 46, a storage unit 48, and a driver 50.

The control unit 46 includes processing circuitry. The processing circuitry may be a processor such as a CPU. The processing circuitry may be an integrated circuit such as an ASIC or an FPGA. The processor can execute various processes by executing programs stored in the storage unit 48. At least some of the plurality of processes may be executed by an electronic circuit including a discrete device.

The control unit 46 outputs a control signal to the driver 50 in order to control each motor 40. Accordingly, the control unit 46 executes stop control of the eight VTOL rotors 20 during flight after lift is generated by the wings (the front wing 14 and the rear wing 16), for example. For example, the control unit 46 can execute the stop control during transition from takeoff to cruise or during cruise. In addition, the control unit 46 sequentially cancels the stop control of the eight VTOL rotors 20 on a group-by-group basis at the stage of transition from cruise to landing.

Among controls performed by the control unit 46, the control for stopping the rotation of each VTOL rotor 20 is referred to as stop control. As the stop control, the control unit 46 may stop the motor 40 by controlling the switching elements of the inverter device 38. As the stop control, the control unit 46 may mechanically fix the VTOL rotor 20.

The control unit 46 can cancel the stop control at an arbitrary timing. For example, in a case where the motor 40 is stopped by controlling the switching elements of the inverter device 38, the control unit 46 can cancel the stop control by stopping the supply of electric power to the motor 40. The control unit 46 can also cancel the stop control by controlling the switching elements of the inverter device 38 to rotate the motor 40. In a case where the VTOL rotor 20 is mechanically fixed, the control unit 46 can cancel the stop control by releasing the mechanically fixed state. In this manner, canceling the stop control means that each VTOL rotor 20 is brought into a rotatable state by an external force (wind or the like) or an internal force (power of the motor 40).

The storage unit 48 includes a volatile memory and a non-volatile memory. Examples of the volatile memory include a RAM and the like. The volatile memory is used as a working memory of the processor. The volatile memory temporarily stores data and the like necessary for processing or computation. Examples of the non-volatile memory include a ROM, a flash memory, and the like. The non-volatile memory is used as a storage memory. The non-volatile memory stores programs, tables, maps, and the like. At least a part of the storage unit 48 may be included in the processor, the integrated circuit, or the like described above.

The non-volatile memory stores an order (see [4] below) in which the stop control of the plurality of VTOL rotors 20 is canceled. For example, the non-volatile memory stores a correspondence relationship between each group (see [3] below) and each VTOL rotor 20, and an order of canceling the stop control (stop control cancellation order) that is assigned to each group. Alternatively, the non-volatile memory may store a stop control cancellation order assigned to each VTOL rotor 20 instead of the stop control cancellation order assigned to each group. In this case, one cancellation order is assigned to the plurality of VTOL rotors 20.

The driver 50 includes a gate driver circuit. In response to the control signal output from the control unit 46, the driver 50 outputs an ON/OFF signal to each switching element included in the inverter circuit of the inverter device 38. Further, in a case where the converter device 36 includes switching elements, the driver 50 outputs an ON/OFF signal to each switching element of the converter device 36.

[3. Grouping of Plurality of VTOL Rotors 20]

According to the present embodiment, the eight VTOL rotors 20 are divided into a plurality of groups in advance. The VTOL rotors 20 are divided into the plurality of groups according to, for example, the distance from a center of gravity G (FIG. 1) of the VTOL aircraft 10 to each VTOL rotor 20. This distance is also referred to as a separation distance. Some patterns of grouping are exemplified below.

[3-1. First Grouping]

Figure 3:
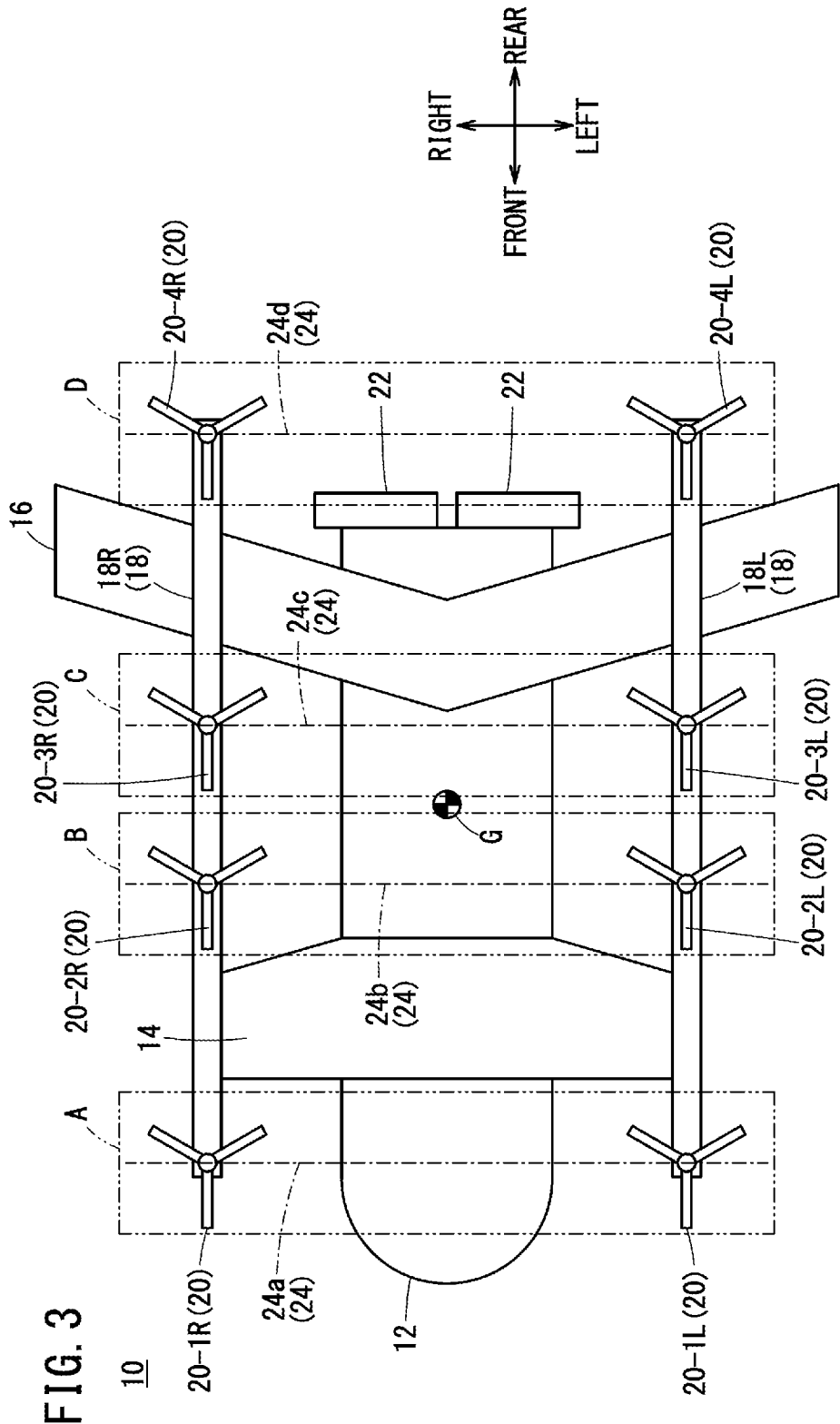
FIG. 3 is a diagram illustrating a first grouping.

FIG. 3 is a diagram illustrating a first grouping. The separation distances from the center of gravity G to the two VTOL rotors 20 in the same row are the same. Thus, in the first grouping, two VTOL rotors 20 in the same row form a group. In other words, the plurality of VTOL rotors 20 located at the same position in the front-rear direction form a group. For example, in the mode shown in FIG. 3, the two VTOL rotors 20 in the first row 24a form a group A. The two VTOL rotors 20 in the second row 24b form a group B. The two VTOL rotors 20 in the third row 24c form a group C. The two VTOL rotors 20 in the fourth row 24d form a group D.

[3-2. Second Grouping]

Figure 4:
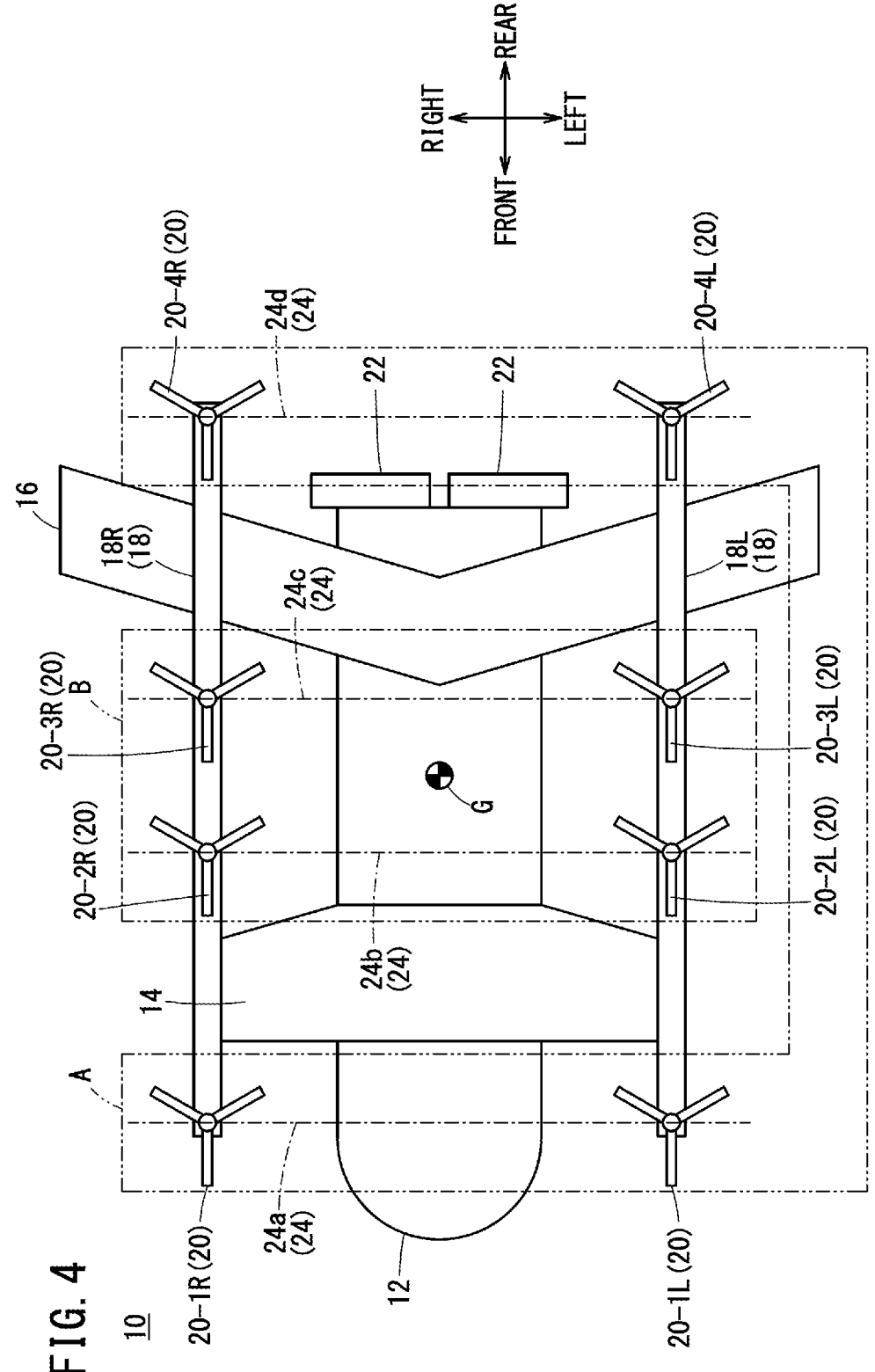
FIG. 4 is a diagram illustrating a second grouping.

FIG. 4 is a diagram illustrating a second grouping. In the second grouping, all the VTOL rotors 20 whose separation distances from the center of gravity G are the same form a group. For example, in the mode shown in FIG. 4, two VTOL rotors 20 in the first row 24a and two VTOL rotors 20 in the fourth row 24d form a group A. Two VTOL rotors 20 in the second row 24b and two VTOL rotors 20 in the third row 24c form a group B.

[3-3. Third Grouping]

A pair of VTOL rotors 20 whose torques cancel each other out may form a group. For example, the VTOL rotor 20-1L in the first row 24a and the VTOL rotor 20-4R in the fourth row 24d cancel each other's torque. The VTOL rotor 20-1R in the first row 24a and the VTOL rotor 20-4L in the fourth row 24d cancel each other's torque. The VTOL rotor 20-2L in the second row 24b and the VTOL rotor 20-3R in the third row 24c cancel each other's torque. The VTOL rotor 20-2R in the second row 24b and the VTOL rotor 20-3L in the third row 24c cancel each other's torque. These four pairs of VTOL rotors 20 may form four groups.

[3-4. Other Grouping]

The grouping may be other than the first to third groupings. For example, in each of the first to third groupings, two or more groups may be further combined into a group.

Note that the plurality of VTOL rotors 20 may be grouped regardless of the separation distance. For example, the plurality of VTOL rotors 20 may be grouped according to the location of each VTOL rotor 20. There is a case that the VTOL aircraft 10 includes three or more VTOL rotors 20 in the same row. This row includes the VTOL rotor 20 whose separation distance from the center of gravity G is relatively long, and the VTOL rotor 20 whose separation distance from the center of gravity G is relatively short. In this type of VTOL aircraft 10, three or more VTOL rotors 20 in the same row may form a group regardless of the separation distance.

[4. Stop Control Cancellation Order of Plurality of VTOL Rotors 20]

As described above, the storage unit 48 stores the order of canceling the stop control of the VTOL rotors 20. Further, the storage unit 48 stores the rotating VTOL rotors 20 and the stopped VTOL rotors 20. Therefore, the control unit 46 can determine the VTOL rotor 20 for which the stop control is to be canceled next. Several examples of the stop control cancellation order will be described below.

[4-1. Stop Control Cancellation Order of Groups by First Grouping (1)]

In the case of the first grouping shown in FIG. 3, the control unit 46 may cancel the stop control of the VTOL rotors 20 in order from the group farthest from the center of gravity G to the group closest to the center of gravity G. There may be a plurality of groups located at the same distance from the center of gravity G. In such a case, the control unit 46 may cancel the stop control of the VTOL rotors 20 in order from the group located on the rear side to the group located on the front side among the plurality of groups located at the same distance from the center of gravity G. Alternatively, the control unit 46 may cancel the stop control of the VTOL rotors 20 in order from the group located on the front side to the group located on the rear side among the plurality of groups located at the same distance from the center of gravity G. The distance from the center of gravity G to each group may be a distance (separation distance) from the center of gravity G to the VTOL rotors 20 in each group or may be a distance from the center of gravity G to the center of gravity of each group.

In the present embodiment, the distance from the center of gravity G to the group A (the two VTOL rotors 20 in the first row 24a) is the same as the distance from the center of gravity G to the group D (the two VTOL rotors 20 in the fourth row 24d). Further, the distance from the center of gravity G to the group B (the two VTOL rotors 20 in the second row 24b) is the same as the distance from the center of gravity G to the group C (the two VTOL rotors 20 in the third row 24c).

The control unit 46 may cancel the stop control of the VTOL rotors 20 in the order of the first row 24a, the fourth row 24d, the second row 24b, and the third row 24c. Alternatively, the control unit 46 may cancel the stop control of the VTOL rotors 20 in the order of the fourth row 24d, the first row 24a, the third row 24c, and the second row 24b.

Figure 5:
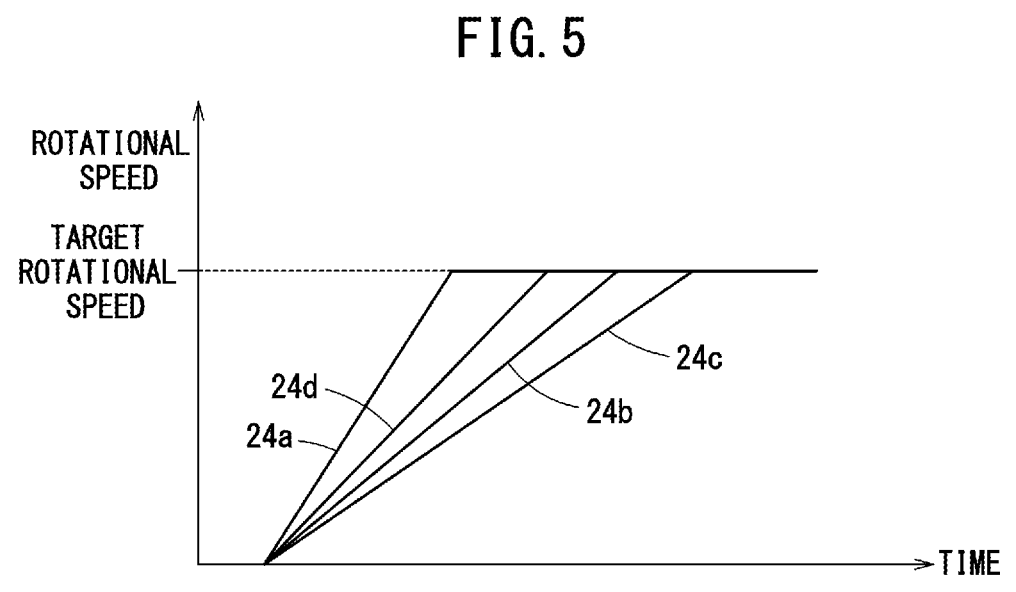
Figure 6:
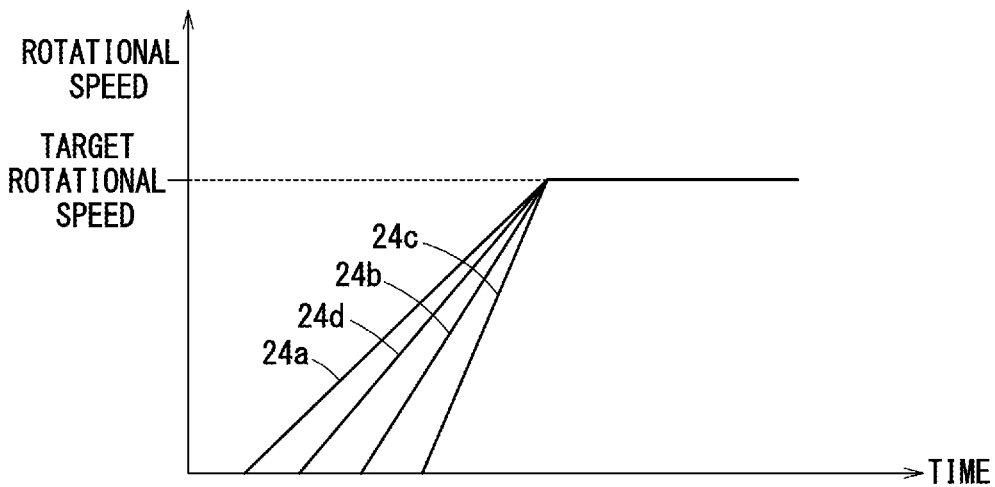
FIG. 6 is a graph illustrating a temporal change in the rotational speed of the VTOL rotors in each row in the first grouping.
Figure 7:
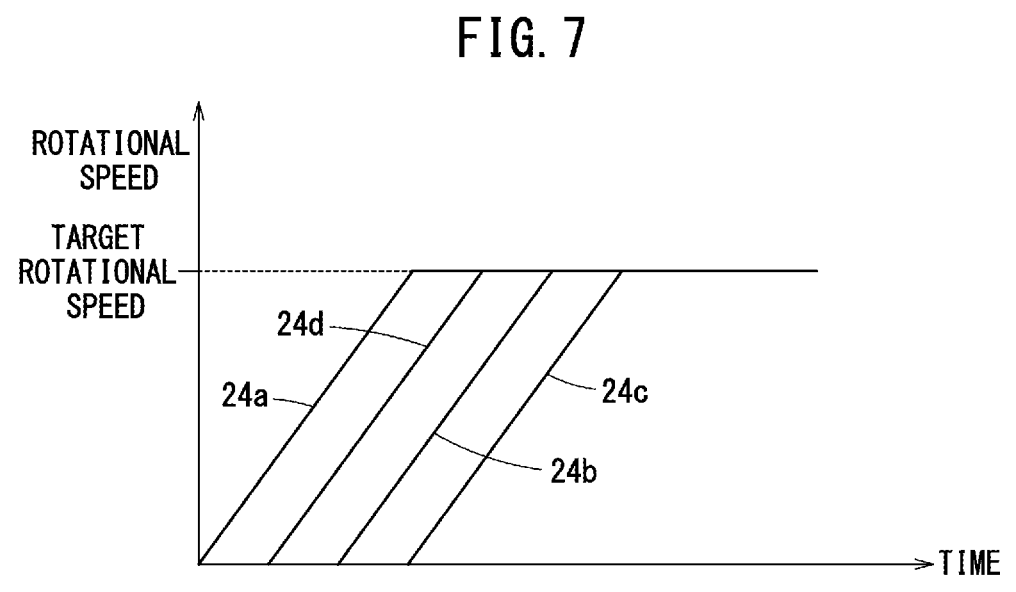

Each of FIGS. 5 to 7 is a graph illustrating a temporal change in the rotational speed of the VTOL rotors 20 in each row 24 in the first grouping. For convenience of explanation, simplified graphs are shown in FIGS. 5 to 7. FIGS. 5 to 7 illustrate graphs of three stop control cancellation patterns. In FIGS. 5 to 7, target rotational speeds of the VTOL rotors 20 in the respective rows 24 (the first row 24a to the fourth row 24d) are the same. Alternatively, the target rotational speeds of the VTOL rotors 20 in the respective rows 24 (the first row 24a to the fourth row 24d) may be different.

As shown in FIG. 5, the control unit 46 may match the timings at which the stop control is canceled, and adjust the order in which an actual rotational speed reaches the target rotational speed. Alternatively, as shown in FIG. 6, the control unit 46 may adjust the order in which the stop control is canceled, and match the timings at which the actual rotational speed reaches the target rotational speed. Alternatively, as shown in FIG. 7, the control unit 46 may adjust the order in which the stop control is canceled, and the order in which the actual rotational speed reaches the target rotational speed.

[4-2. Stop Control Cancellation Order of Groups by First Grouping (2)]

In the case of the first grouping shown in FIG. 3, the control unit 46 may cancel the stop control of the VTOL rotors 20 in order from the group closest to the center of gravity G to the group farthest from the center of gravity G. The other stop control cancellation rules are the same as those in [4-1].

The control unit 46 may cancel the stop control of the VTOL rotors 20 in the order of the third row 24c, the second row 24b, the fourth row 24d, and the first row 24a. Alternatively, the control unit 46 may cancel the stop control of the VTOL rotors 20 in the order of the second row 24b, the third row 24c, the first row 24a, and the fourth row 24d.

[4-3. Stop Control Cancellation Order of Groups by First Grouping (3)]

The control unit 46 may cancel the stop control of the VTOL rotors 20 in a predetermined order regardless of the center of gravity G. The eight VTOL rotors 20 may be divided into small groups (the first row 24a to the fourth row 24d) by the first grouping, and the plurality of small groups may be further divided into a plurality of large groups. In this grouping, the control unit 46 sequentially selects a small group from the plurality of large groups and sequentially cancels the stop control of the VTOL rotors 20 in order from the selected small group.

For example, four small groups (the first row 24a to the fourth row 24d) may be divided into two large groups, which are a front group (the first row 24a and the second row 24b)

and a rear group (the third row 24c and the fourth row 24d). In this grouping, the control unit 46 may select a small group alternately from the front group and the rear group, and cancel the stop control of the VTOL rotors 20 in order from the selected small group. As a specific example, the control unit 46 may cancel the stop control of the VTOL rotors 20 in the order of the first row 24a, the fourth row 24d, the second row 24b, and the third row 24c. This order is the same as the cancellation order shown in FIG. 5 and the like. Alternatively, the control unit 46 may cancel the stop control of the VTOL rotors 20 in the order of the fourth row 24d, the first row 24a, the third row 24c, and the second row 24b. Alternatively, the control unit 46 may cancel the stop control of the VTOL rotors 20 in the order of the first row 24a, the third row 24c, the second row 24b, and the fourth row 24d. Alternatively, the control unit 46 may cancel the stop control of the VTOL rotors 20 in the order of the fourth row 24d, the second row 24b, the third row 24c, and the first row 24a.

[4-4. Stop Control Cancellation Order of Groups by Second Grouping (1)]

In the case of the second grouping shown in FIG. 4, the control unit 46 may cancel the stop control of the VTOL rotors 20 in order from the group farthest from the center of gravity G to the group closest to the center of gravity G.

The control unit 46 may first cancel the stop control of the VTOL rotors 20 in each of the first row 24a and the fourth row 24d. Next, the control unit 46 may cancel the stop control of the VTOL rotors 20 in each of the second row 24b and the third row 24c.

Figure 8:
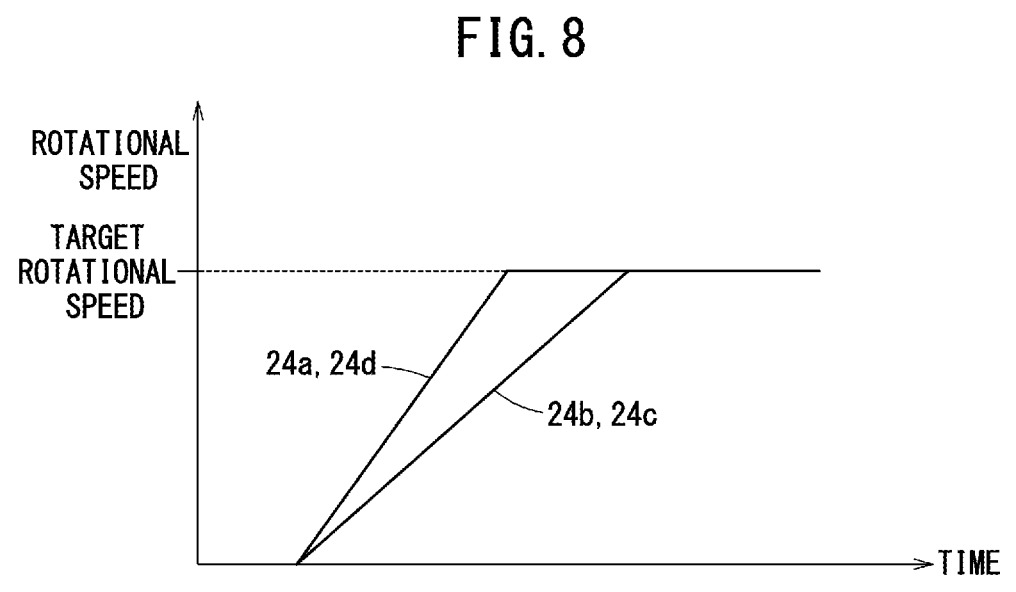
Figure 9:
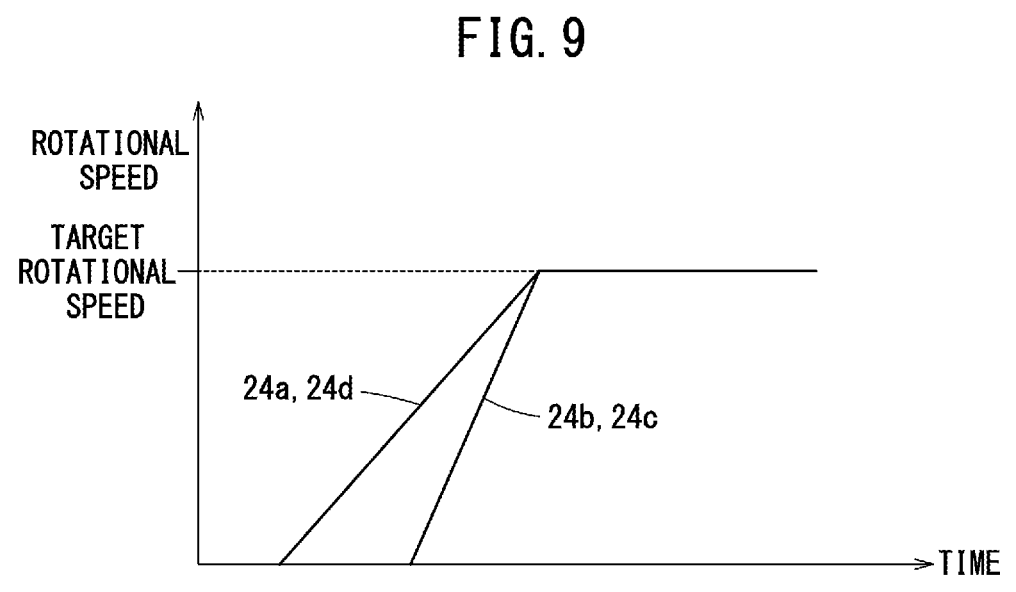
Figure 10:
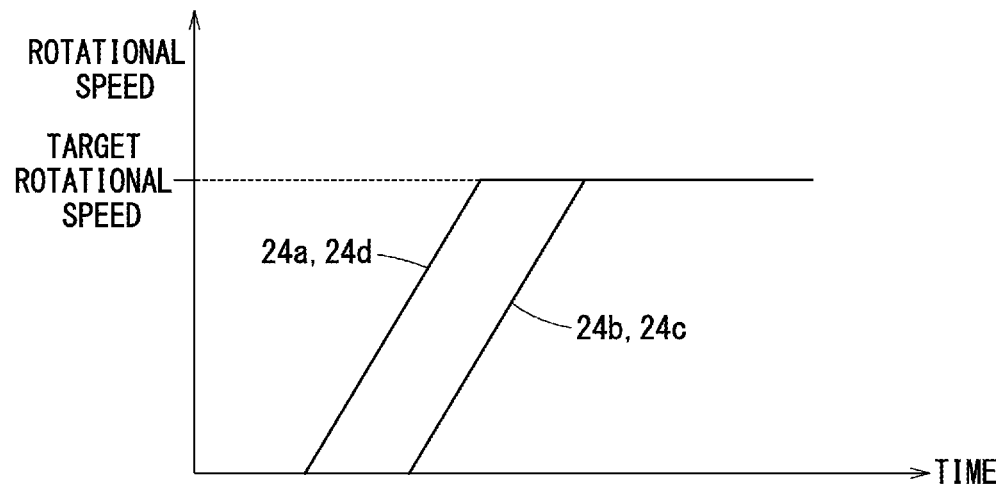
FIG. 10 is a graph illustrating a temporal change in the rotational speed of the VTOL rotors in each row in the second grouping.

Each of FIGS. 8 to 10 is a graph illustrating a temporal change in the rotational speed of the VTOL rotors 20 in each row 24 in the second grouping. For convenience of explanation, simplified graphs are shown in FIGS. 8 to 10. FIGS. 8 to 10 illustrate graphs of three stop control cancellation patterns. In FIGS. 8 to 10, target rotational speeds of the VTOL rotors 20 in the respective rows 24 (the first row 24a to the fourth row 24d) are the same. Alternatively, the target rotational speeds of the VTOL rotors 20 in the respective rows 24 (the first row 24a to the fourth row 24d) may be different.

As shown in FIG. 8, the control unit 46 may match the timings at which the stop control is canceled, and adjust the order in which an actual rotational speed reaches the target rotational speed. Alternatively, as shown in FIG. 9, the control unit 46 may adjust the order in which the stop control is canceled, and match the timings at which the actual rotational speed reaches the target rotational speed. Alternatively, as shown in FIG. 10, the control unit 46 may adjust the order in which the stop control is canceled, and the order in which the actual rotational speed reaches the target rotational speed.

[4-5. Stop Control Cancellation Order of Groups by Second Grouping (2)]

In the case of the second grouping shown in FIG. 4, the control unit 46 may cancel the stop control of the VTOL rotors 20 in order from the group closest to the center of gravity G to the group farthest from the center of gravity G.

The control unit 46 may first cancel the stop control of the VTOL rotors 20 in each of the second row 24b and the third row 24c. Next, the control unit 46 may cancel the stop control of the VTOL rotors 20 in each of the first row 24a and the fourth row 24d.

[5. Stop Control Cancellation Process Performed by Control Unit 46]

Figure 11:
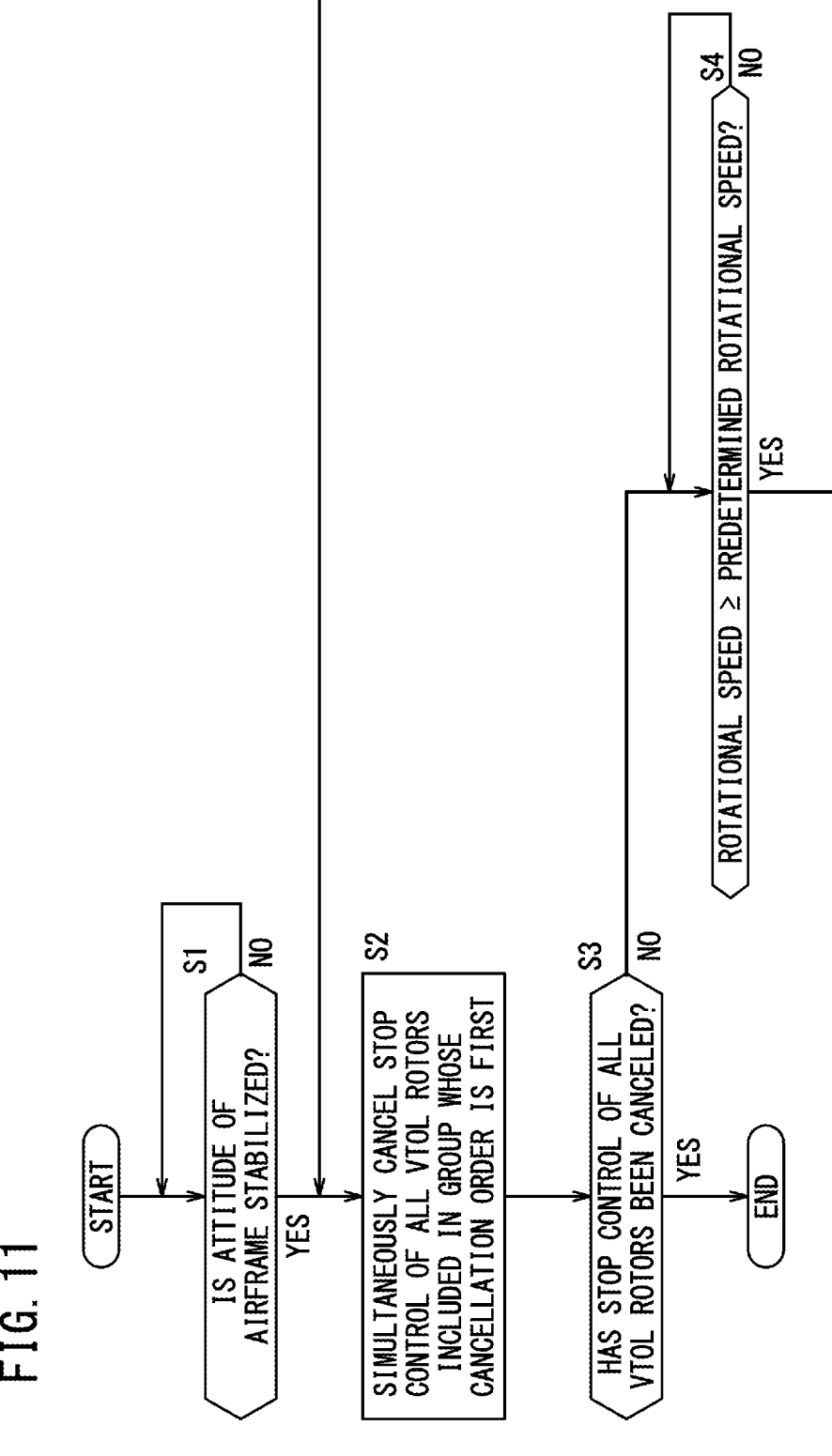
FIG. 11 is a flowchart of a process of canceling stop control performed by a control unit.

FIG. 11 is a flowchart of a process of canceling the stop control performed by the control unit 46. The control unit 46 starts the process shown in FIG. 11 after the VTOL aircraft 10 transitions from takeoff to cruise. For example, in a state where the VTOL aircraft 10 is moving forward at or above a predetermined speed, the wings (the front wing 14 and the rear wing 16) generate sufficient lift. Therefore, after operating the cruise rotors 22, the control unit 46 may stop the rotation of each VTOL rotor 20 in response to the forward speed becoming equal to or higher than the predetermined speed. Note that the control unit 46 always causes the storage unit 48 to store the operation state (rotation or stop) of each VTOL rotor 20.

In step S1, the control unit 46 determines whether or not the attitude of an airframe (the aircraft) is stabilized. For example, the control unit 46 may determine the degree of stability of the attitude of the airframe, based on each of the pitch, the roll, and the yaw. When the pitch is within a predetermined pitch range, the control unit 46 determines that the behavior in the pitch direction is stable. When the roll is within a predetermined roll range, the control unit 46 determines that the behavior in the roll direction is stable. When the yaw is within a predetermined yaw range, the control unit 46 determines that the behavior in the yaw direction is stable. Each of the pitch range, the roll range, and the yaw range is stored in advance in the storage unit 48. When the behavior in each of the pitch direction, the roll direction, and the yaw direction is stable, the control unit 46 determines that the attitude of the airframe is stabilized. On the other hand, when the behavior in at least one of the pitch direction, the roll direction, or the yaw direction is not stable, the control unit 46 determines that the attitude of the airframe is not stabilized. When the attitude of the airframe is stabilized (step S1: YES), the process proceeds to step S2. On the other hand, when the attitude of the airframe is not stabilized (step S1: NO), the determination in step S1 is repeated.

In step S2, the control unit 46 selects a group whose stop control cancellation order is the first, among the groups in which the stop control of the VTOL rotors 20 is executed. The control unit 46 simultaneously cancels the stop control of all the VTOL rotors 20 included in the selected group. The control unit 46 causes the storage unit 48 to store the VTOL rotors 20 for which the stop control has been canceled. When the process of step S2 is ended, the process proceeds to step S3.

In step S3, the control unit 46 determines whether or not the stop control of all the VTOL rotors 20 has been canceled. When the stop control of all the VTOL rotors 20 has been canceled (step S3: YES), the process of canceling the stop control illustrated in FIG. 11 is ended. On the other hand, when some of the VTOL rotors 20 are stopped (step S3: NO), the process proceeds to step S4.

In step S4, the control unit 46 determines whether the rotational speed of the VTOL rotors 20 of the group for which the stop control has been canceled most recently has become equal to or higher than a predetermined rotational speed. The predetermined rotational speed is an arbitrary threshold used for the determination in step S4. The predetermined rotational speed is stored in advance in the storage unit 48. For example, the control unit 46 may compare the rotational speed of a specified VTOL rotor 20 among the plurality of VTOL rotors 20 included in the group for which the stop control has been canceled most recently, with the predetermined rotational speed. Alternatively, the control unit 46 may compare the average value of the rotational speeds of the plurality of VTOL rotors 20 included in the group for which the stop control has been canceled most recently, with the predetermined rotational speed. Alternatively, the control unit 46 may compare the maximum rotational speed among the rotational speeds of the plurality of VTOL rotors 20 included in the group for which the stop control has been canceled most recently, with the predetermined rotational speed. Alternatively, the control unit 46 may compare the minimum rotational speed among the rotational speeds of the plurality of VTOL rotors 20 included in the group for which the stop control has been canceled most recently, with the predetermined rotational speed. When the rotational speed of the VTOL rotors 20 is equal to or higher than the predetermined rotational speed (step S4: YES), the process returns to step S2. On the other hand, when the rotational speed of the VTOL rotors 20 is lower than the predetermined rotational speed (step S4: NO), the determination in step S4 is executed again.

As described above, in the present embodiment, the control unit 46 does not simultaneously cancel the stop control of all the VTOL rotors 20, but cancels the stop control of the VTOL rotors 20 on a predetermined group-by-group basis. As a result, since the thrust in the vertical direction gradually increases, it is possible to suppress a change in the thrust in the vertical direction. Therefore, it is possible to suppress a change in the ride comfort of the VTOL aircraft 10 at the stage of transition from cruise to landing.

[6. Others]

Figure 12:
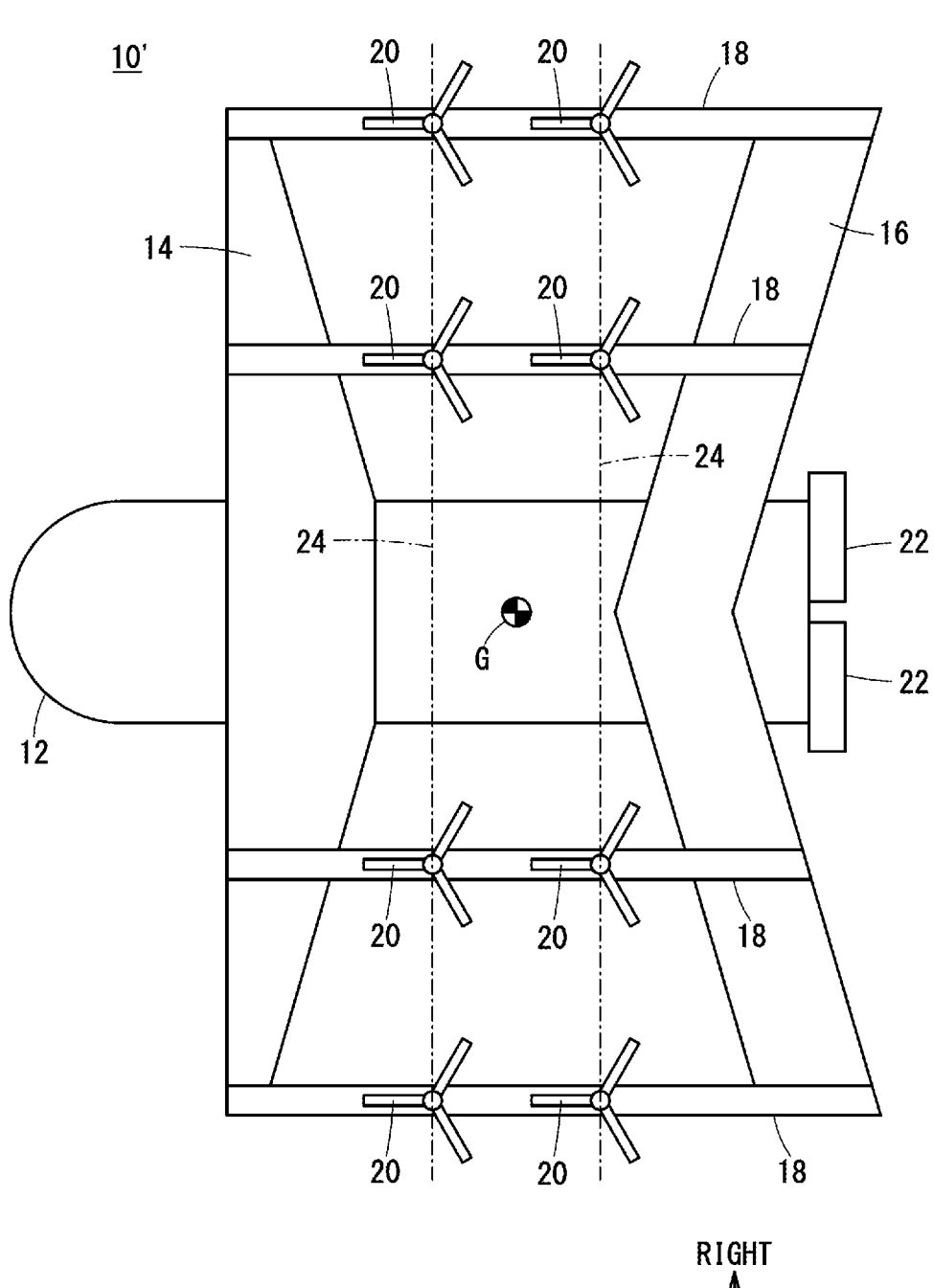
FIG. 12 is a top view of a vertical take-off and landing aircraft of a different type from that of the vertical take-off and landing aircraft of FIG. 1.

FIG. 12 is a top view of a vertical take-off and landing aircraft 10' of a different type from that of the vertical take-off and landing aircraft 10 of FIG. 1. The vertical take-off and landing aircraft 10' includes eight VTOL rotors 20 and four booms 18. Two VTOL rotors 20 are arranged on each boom 18. The eight VTOL rotors 20 form two rows 24 extending in the left-right direction. In this type of VTOL aircraft 10', the eight VTOL rotors 20 may be divided into a plurality of groups, and the stop control cancellation order of the VTOL rotors 20 may be determined on a group-by-group basis.

[7. Appendices]

The following notes (appendices) are further disclosed in relation to the above-described embodiment.

Appendix 1

According to the aspect of the present invention, provided is the vertical take-off and landing aircraft (10, 10') including: a plurality of VTOL rotors (20) configured to generate thrust in a vertical direction; at least one cruise rotor (22) configured to generate thrust in a horizontal direction; at least one wing (14, 16) configured to generate lift as the vertical take-off and landing aircraft moves in the horizontal direction; and a controller (44) configured to control the operation of each of the plurality of VTOL rotors and the operation of each of the at least one cruise rotor, wherein the plurality of VTOL rotors are divided into a plurality of groups, each of the VTOL rotors being included in any one of the groups, and the controller can perform stop control for stopping the rotation operation of each of the VTOL rotors during flight of the vertical take-off and landing aircraft; and in a case of canceling the stop control of the plurality of VTOL rotors, the controller performs cancellation of the stop control sequentially on a group-by-group basis.

In the above configuration, the controller does not simultaneously cancel the stop control of all the VTOL rotors, but cancels the stop control of the VTOL rotors on a predetermined group-by-group basis. According to the above configuration, since the thrust in the vertical direction gradually increases, it is possible to minimize a change in the thrust in the vertical direction. Therefore, it is possible to suppress a change in the ride comfort of the VTOL aircraft at the stage of transition from cruise to landing.

Appendix 2

In the vertical take-off and landing aircraft according to Appendix 1, the VTOL rotors may be divided into the plurality of groups according to distances from the center of gravity (G) of the vertical take-off and landing aircraft to the respective VTOL rotors.

Appendix 3

In the vertical take-off and landing aircraft according to Appendix 2, each of the groups may be constituted by the plurality of VTOL rotors the distances of which from the center of gravity are equal to each other. According to this configuration, it is possible to maintain the balance of the thrust in the vertical direction before and after the cancellation of the stop control of the VTOL rotors.

Appendix 4

In the vertical take-off and landing aircraft according to Appendix 2, each of the groups may further be constituted by the plurality of the VTOL rotors located at the same position in the front-rear direction. According to this configuration, it is possible to maintain the balance of the force in the roll direction before and after the cancellation of the stop control of the VTOL rotors.

Appendix 5

In the vertical take-off and landing aircraft according to Appendix 3 or 4, the controller may cancel the stop control in order from the group farthest from the center of gravity to the group closest to the center of gravity.

Appendix 6

In the vertical take-off and landing aircraft according to Appendix 3 or 4, the controller may cancel the stop control in order from the group closest to the center of gravity to the group farthest from the center of gravity.

Appendix 7

In the vertical take-off and landing aircraft according to Appendix 4, in a case where a plurality of the groups the distances of which from the center of gravity are equal to each other exist, the controller may cancel the stop control in order from the group located on the rear side to the group located on the front side among the plurality of groups the distances of which from the center of gravity are equal to each other.

Appendix 8

In the vertical take-off and landing aircraft according to Appendix 4, in a case where a plurality of the groups the distances of which from the center of gravity are equal to each other exist, the controller may cancel the stop control in order from the group located on the front side to the group located on the rear side among the plurality of groups the distances of which from the center of gravity are equal to each other.

Appendix 9

In the vertical take-off and landing aircraft according to Appendix 1, in a case where the stop control for a first group and the stop control for a second group are successively canceled, the controller may cancel the stop control for the second group after the rotational speed of each of the VTOL rotors of the first group for which the stop control has been cancelled becomes equal to or higher than a predetermined rotational speed.

The present invention is not limited to the above disclosure, and various modifications are possible without departing from the essence and gist of the present invention.

The invention claimed is:

1. A vertical take-off and landing aircraft comprising:
a plurality of vertical take-off and landing rotors configured to generate thrust in a vertical direction;
at least one cruise rotor configured to generate thrust in a horizontal direction;
at least one wing configured to generate lift as the vertical take-off and landing aircraft moves in the horizontal direction; and
one or more processors that execute computer-executable instructions stored in a memory,
wherein the plurality of vertical take-off and landing rotors are divided into a plurality of groups, each of the vertical take-off and landing rotors being included in any one of the groups, and
the one or more processors execute the computer-executable instructions to cause the vertical take-off and landing aircraft to:
control an operation of each of the plurality of vertical take-off and landing rotors and an operation of each of the at least one cruise rotor;
perform stop control for stopping a rotation operation of each of the vertical take-off and landing rotors during flight of the vertical take-off and landing aircraft; and
in a case of canceling the stop control of the plurality of vertical take-off and landing rotors, perform cancellation of the stop control sequentially on a group-by-group basis, cancelling the stop control in order from a group farthest from the center of gravity to a group closer to the center of gravity among the plurality of groups.

2. The vertical take-off and landing aircraft according to claim 1, wherein
in a case where a plurality of the groups the distances of which from the center of gravity are equal to each other exist, the one or more processors cause the vertical take-off and landing aircraft to cancel the stop control in order from a group located on a rear side to a group located on a front side among the plurality of groups the distances of which from the center of gravity are equal to each other.

3. The vertical take-off and landing aircraft according to claim 1, wherein
in a case where a plurality of the groups the distances of which from the center of gravity are equal to each other exist, the one or more processors cause the vertical take-off and landing aircraft to cancel the stop control in order from a group located on a front side to a group located on a rear side among the plurality of groups the distances of which from the center of gravity are equal to each other.

4. The vertical take-off and landing aircraft according to claim 1, wherein the one or more processors cause the vertical take-off and landing aircraft to make a first duration longer than a second duration, where the first duration is a time required for an actual rotational speed of each of the vertical take-off and landing rotors belonging to the group with the stop control being canceled first to reach a target rotational speed, and the second duration is a time required for an actual rotational speed of each of the vertical take-off and landing rotors belonging to the group with the stop control being canceled second to reach the target rotational speed.

5. The vertical take-off and landing aircraft according to claim 1, wherein the one or more processors cause the vertical take-off and landing aircraft to synchronize timings at which an actual rotational speed of each of the vertical take-off and landing rotors belonging to each of the groups reaches a target rotational speed.

6. A vertical take-off and landing aircraft comprising:

a plurality of vertical take-off and landing rotors configured to generate thrust in a vertical direction;

at least one cruise rotor configured to generate thrust in a horizontal direction;

at least one wing configured to generate lift as the vertical take-off and landing aircraft moves in the horizontal direction; and one or more processors that execute computer-executable instructions stored in a memory, wherein the plurality of vertical take-off and landing rotors are divided into a plurality of groups, each of the vertical take-off and landing rotors being included in any one of the groups, and the one or more processors execute the computer-executable instructions to cause the vertical take-off and landing aircraft to:

control an operation of each of the plurality of vertical take-off and landing rotors and an operation of each of the at least one cruise rotor;

perform stop control for stopping a rotation operation of each of the vertical take-off and landing rotors during flight of the vertical take-off and landing aircraft;

in a case of canceling the stop control of the plurality of vertical take-off and landing rotors, perform cancellation of the stop control sequentially on a group-by-group basis, wherein in a case where the stop control for a first group and the stop control for a second group are successively canceled, the one or more processors cause the vertical take-off and landing aircraft to cancel the stop control for the second group after a rotational speed of each of the vertical take-off and landing rotors of the first group for which the stop control has been canceled becomes equal to or higher than a predetermined rotational speed.

7. A vertical take-off and landing aircraft comprising:

a plurality of vertical take-off and landing rotors configured to generate thrust in a vertical direction;

at least one cruise rotor configured to generate thrust in a horizontal direction;

at least one wing configured to generate lift as the vertical take-off and landing aircraft moves in the horizontal direction; and one or more processors that execute computer-executable instructions stored in a memory, wherein the plurality of vertical take-off and landing rotors are divided into a plurality of groups, each of the vertical take-off and landing rotors being included in any one of the groups, the vertical take-off and landing rotors are divided into the plurality of groups according to distances from a center of gravity of the vertical take-off and landing aircraft to the respective vertical take-off and landing rotors, and each of the groups is constituted by a plurality of the vertical take-off and landing rotors the distances of which from the center of gravity are equal to each other, the one or more processors execute the computer-executable instructions to cause the vertical take-off and landing aircraft to:

control an operation of each of the plurality of vertical take-off and landing rotors and an operation of each of the at least one cruise rotor;

perform stop control for stopping a rotation operation of each of the vertical take-off and landing rotors during flight of the vertical take-off and landing aircraft;

synchronize timings at which the stop control of the plurality of vertical take-off and landing rotors is canceled; and vary timings at which an actual rotational speed of the vertical take-off and landing rotors reaches a target rotational speed, depending on the groups.

8. The vertical take-off and landing aircraft according to claim 7, wherein the one or more processors execute the computer-executable instructions to cause the vertical take-off and landing aircraft to make a timing earlier at which the actual rotational speed of the vertical take-off and landing rotors belonging to a group farther from the center of gravity reaches the target rotational speed than a timing at which the actual rotational speed of the vertical take-off and landing rotors belonging to a group closer to the center of gravity reaches the target rotational speed.

* * * * *